Sept. 23, 1958
A. W. BARBER
2,853,357
PULSE PACKING SYSTEM FOR MAGNETIC RECORDING
OF BINARY CODED INFORMATION
Filed Jan. 19, 1951
4 Sheets-Sheet 1

INVENTOR.
BY Alfred W. Barber
ATTORNEY

INVENTOR.
BY *Alfred W. Barber*
ATTORNEY

Sept. 23, 1958 A. W. BARBER 2,853,357

PULSE PACKING SYSTEM FOR MAGNETIC RECORDING OF BINARY CODED INFORMATION

Filed Jan. 19, 1951 4 Sheets-Sheet 3

INVENTOR.
Alfred W. Barber

Sept. 23, 1958

A. W. BARBER

PULSE PACKING SYSTEM FOR MAGNETIC RECORDING OF BINARY CODED INFORMATION 2,853,357

Filed Jan. 19, 1951

4 Sheets-Sheet 4

INVENTOR.

BY Alfred W. Barber

ATTORNEY

United States Patent Office 2,853,357
Patented Sept. 23, 1958

2,853,357

PULSE PACKING SYSTEM FOR MAGNETIC RECORDING OF BINARY CODED INFORMATION

Alfred W. Barber, Flushing, N. Y., assignor to John T. Potter, Locust Valley, N. Y.

Application January 19, 1951, Serial No. 206,767

1 Claim. (Cl. 346—74)

The present invention relates to recording and, in particular, to magnetic recording of coded information and the like.

There are a number of business systems in which information is recorded mechanically. As an example information of various types is recorded by means of punched cards. In such a system the information to be recorded is coded according to a predetermined code to provide a pattern representing the information. This pattern is entered in a machine which punches the pattern on a card. Another machine is utilized to sort cards according to the identity of certain parts of the patterns or to by other means derive tabulated information.

A machine for recording information magnetically on steel wires and according to a code is described in the application for Letters Patent of John T. Potter, filed on Sept. 1, 1948, and bearing Serial Number 47,292. In order to make a storage system of this type most effective it has been found that the type of signal and the method of recording are very important. In order to provide for recording a maximum amount of information per unit length of the recording medium and to provide a maximum reliability and for other reasons to be set forth the type of signal and method of recording of the present invention have been found of great advantage.

According to the present invention two conditions are recorded which, for convenience, may be designated as "yes" and "no." The information to be recorded is coded in a series of these "yes" or "no" conditions. A signal of a predetermined frequency or a square wave of predetermined period is recorded to represent 'yes" and the corresponding "no" is represented and recorded by frequency or phase shift of the "yes" signal. In its preferred form the "yes" signal is a single cycle of a square wave signal and the "no" signal is obtained by shifting the phase of the "yes" signal by 180 degrees. A series of miscellaneous bits of information is represented by a contiguous series of such square waves. Some of the more important advantages of the present invention are as follows: the practical elimination of transients in the recorded signal and play-back; the substantial reduction of harmonics; the provision of a signal which, if degraded, may be readily reconstructed; and ability to record substantially more information per unit length of the recording medium than was possible by previous methods.

The term "square wave" is used to designate a rectangular wave having equal positive and negative portions as contrasted with a pulse which is unbalanced having only a positive or negative excursion. A degraded square wave is therefore in its limiting case a single cycle of a sine wave.

In the past positive and negative pulses have been recorded on magnetic media to represent information to be stored. When an attempt was made to "pack" a maximum number of these recorded pulses per unit length on the magnetic medium it was found that adjacent pulses interfered with one another and it was necessary to leave a space between pulses which was large compared to the duration of the pulse in order to overcome this interference. Thus the number of pulses which it was possible to record per unit length was seriously limited. With the square wave signal and methods of recording according to the present invention, no space is left between adjacent signals and as a result a great many more signals per unit length of the medium may be recorded. One form of the present invention comprises a continuously operating square wave generator, a phase inverter and two gates one for feeding in-phase square wave signals to the recorder and the other for feeding phase inverted signals to the recorder. This system may be operated by controlling the in-phase gate in accordance with "yes" signals and the phase inverted gate in accordance with "no" signals thereby recording the corresponding in-phase or out-of-phase signals on the recording medium. Another way in which the invention may be carried out is by means of a punched tape in which combinations of two holes are punched. One hole is scanned by one photo-electric cell to provide the positive half of the square wave while the other hole is scanned by a second photo-electric cell to provide the negative half of the square wave. Thus holes 1–2 in sequence provide "yes" upon scanning and holes in 2–1 sequence provide "no." The paper tape may be punched with two punches, one carrying the 1–2 sequence and the other the 2–1 sequence.

One object of the present invention is to provide a method of and means for recording a greatly increased amount of "yes" and "no" information per unit length of a magnetic recording medium.

Another object is to provide a method of and means for recording coded information on a magnetic medium in such a way as to minimize transients in the recordings.

Still another object is to provide a method of and means for recording coded information in a form which lends itself to reconstruction in the case of degradation in the process of recording and reproduction.

A further object is to provide simplified apparatus for generating coded information recording signals.

A still further object is to provide simplified phase or frequency shift recording of coded information signals on magnetic media.

These and other objects will be apparent to those skilled in the art from the detailed description of the invention given in connection with the various figures of the drawing.

Figure 1:
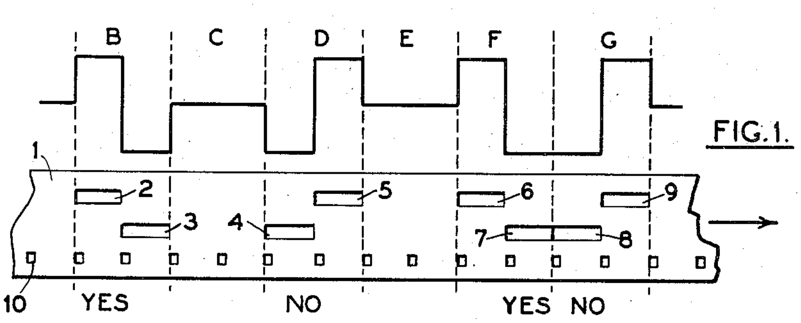
Fig. 1 shows a punched tape and wave-form useful in explaining the invention.

In Fig. 1 is shown a punched tape 1 carrying punchings 2 through 9 and uniformly spaced sprocket holes 10 providing a means of moving the tape in a manner bearing a known or fixed relationship to the punchings it carries. It will be evident that the upper row of punchings, namely 2, 5, 6 and 9 may be scanned with a device such as a photo-electric cell to provide positive excursions of voltage as shown in the rectangles above mid-line of curve A and the lower row of punchings may be scanned to produce negative excursions of voltage. Thus, if "yes" is to be represented by a square which starts in a positive direction from zero as shown at B this may be obtained from scanning punchings 2 and 3 in that sequence. Similarly "no" may be represented by a square wave shifted 180 degrees from the wave representing "yes" as shown at D and this "no" wave may be generated by scanning punchings 4 and 5 in sequence. Accordingly a punched tape may carry "yes" and "no" information convertable into square waves of opposite phase provided by scanning two punched holes in opposite sequence. As shown on tape 1, "yes" is represented by punched holes 2—3 and 6—7 and the corresponding square waves B and F while "no" is represented by 4—5 and 8—9 and square waves D and G.

Figures 2, 3:
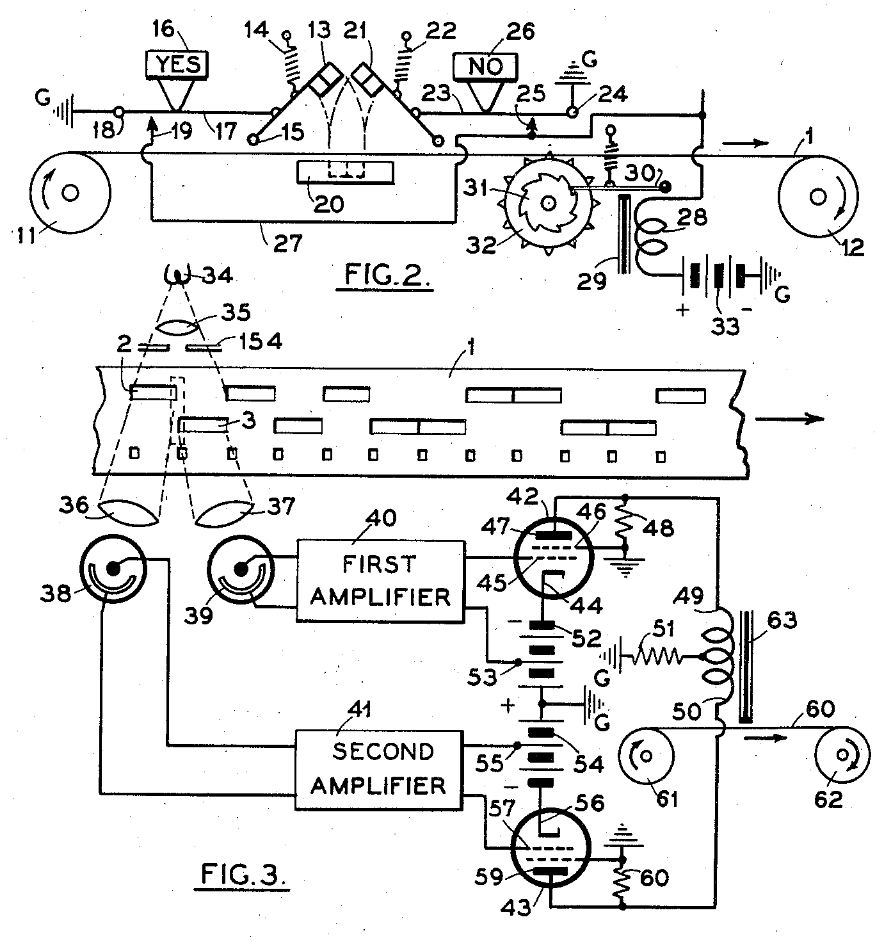
Fig. 2 shows a device suitable for punching "yes" and "no" patterns in a paper tape.
Fig. 3 shows a simple form of the present invention.

Fig. 2 shows a device suitable for punching the "yes" and "no" patterns of the type shown in Fig. 1 in a paper tape. Punch 13 is of a form to punch holes corresponding to 2—3 of Fig. 1 while punch 21 is of a form to punch holes corresponding to 4—5 of Fig. 1. Punch 13 may be arranged in any convenient form for example, as shown pivoted at 15, returned by spring 14 and actuated by key 16 acting through arm 17 pivoted at 18. Similarly punch 21 may be returned by spring 22 and actuated by key 26 acting over arm 23 pivoted at 24. A platen 20 is provided under tape 1 to receive punches 13 and 21. Tape 1 is moved in some predetermined manner as by intermittently operating sprocket 32 and passed from feed spool 11 to take-up spool 12. A simple intermittent motion is provided by means ratchet 31 pulled down by armature 30 in response to the magnetizing of core 29 by coil 28. Coil 28 is energized from battery 33 each time either contact 25 or contact 19 over lead 27 is closed. One of these contacts is closed each time the "no" or "yes" buttons are pushed since contact 25 is closed to ground by arm 23 when the "no" button is pushed and contact 19 is closed to ground by arm 17 when the "yes" button is pushed. Thus, each time the "no" or "yes" button is pushed tape 1 is advanced a predetermined amount automatically and the punchings on the tape will provide a continuous spaced pattern. It will be seen that the tape shown in Fig. 1 has not been punched continuously since it has spaces at C and E but that the tape shown in Fig. 3 has been punched with continuous and contiguous patterns representing "yes" and "no" information.

Fig. 3 shows one form of the present invention suitable for transferring "yes" and "no" information from one source such as a punched tape to a recording on a magnetic medium in the form of a square wave recording. Tape 1 forms a source of "yes" and "no" information in the punched pattern it carries, slots 2—3, for instance, representing "yes." The tape is moved in a predetermined manner by suitable means, not shown, for scanning purposes. A convenient scanning system includes a light source 34, lens 35 and scanning slot 154 with further lenses 36 and 37 directing light passing through the punched slots 2—3, etc. into corresponding photo-electric cells 38 and 39. This scanning system is arranged so that slots like 2 in the upper row on the tape and representing the part of the scanned waveform above the line are scanned by photo-electric cell 38 and the lower slots like 3 representing the part of the waveform below the line are scanned by photo-electric cell 39. Thus, amplifier 40 receiving signals from photo-electric cell 39 receives and amplifies signals representing the lower half of waveform and applies the amplified signals to grid 45 of output tube 42. Similarly, amplifier 41 receives signals from photo-electric cell 38 representing upper half wave-forms, amplifies them and applies the amplified signals to grid 57 of output tube 43. Output tube 42 includes cathode 44 heated by suitable means, not shown, control grid 45, screen grid 46 and plate 47 while output tube 43 includes cathode 56 heated by suitable means, not shown, control grid 57, screen grid 58 and plate 59. The circuit of plate 47 passes through coil 49 forming one-half of a push-pull magnetic recording head circuit, resistor 51 to ground G and from ground G through plate battery 52 to cathode 44. The return of amplifier 40 is connected at point 53 of battery 52 in order to supply suitable grid bias to grid 45.

Similarly, plate 59 is connected through coil 50 forming the second half of the push-pull recording head circuit, resistor 51 to ground G and through battery 54 to cathode 56. The return of amplifier 41 is connected to point 55 on battery 54. Resistor 48 is connected from plate 47 to ground G while resistor 60 is connected from plate 59 to ground G. Resistors 48 and 60 in shunt with the plate circuits and resistor 51 in series are chosen in a manner well known in the art to provide best operating conditions for the tubes and recording head which they drive. The magnetic recording head is represented by the two push-pull coils 49 and 50 and the magnetic core 63 and it is positioned to record magnetically on the magnetic wire or tape 60 passing between suitable spools 61 and 62. It will be understood that amplifiers 40 and 41 may be any suitable conventional so called D. C. amplifiers connected in the proper polarity to give output voltages of the same polarity in response to light received by their respective photo-electric cells 39 and 38. Hence, if light passes through one of the slots in the upper row in the tape, and a resulting current passes through coil 50 of the recording head, light passing through a slot in the lower row will pass an equal current through coil 49. Since coils 49 and 50 are wound in opposite directions, the current through one will magnetize in the opposite direction to the other. It will be seen from this that the sequential scanning a slot in the upper row and a slot in the lower row will generate a square wave and that this square wave will represent "yes" or "no" depending upon the order in which the slots are punched in the tape.

Figure 4:
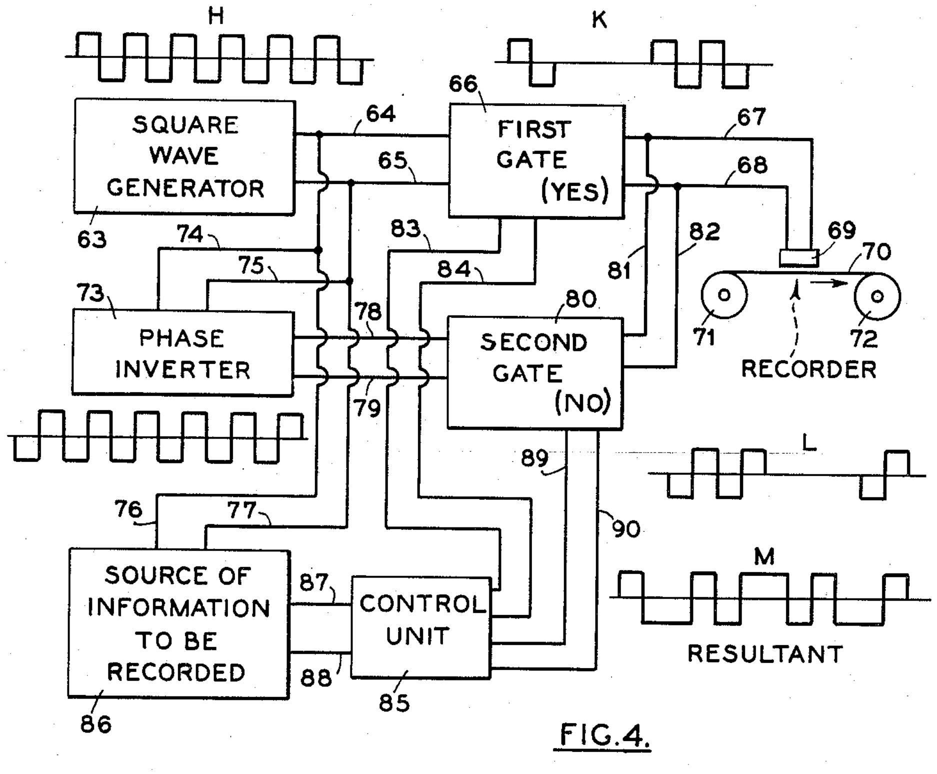
Fig. 4 shows a modified form of the present invention in block diagram.
Figure 7:
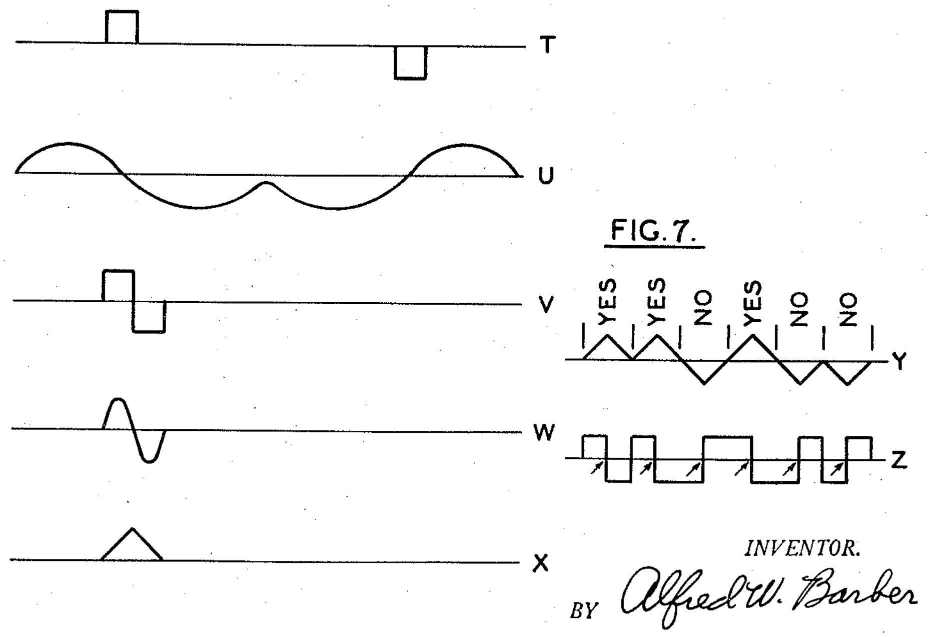

Fig. 4 shows in block diagram a modified form of the present invention in which signals from a square wave generator are gated or are inverted and gated to provide "yes" and "no" signals which are recorded on a magnetic medium. Square wave generator 63 generates a steady flow of square waves of suitable repetition rate as represented at H. The output of generator is applied to first gate 66 over leads 64—65 and to phase inverter 73 over leads 74—75. The phase inverted square waves from inverter 73 are applied to the second gate 80 over leads 78—79. The outputs of the two gates are applied to the magnetic recording head 69 over leads 67—68 and 81—82 for recording on a magnetic medium 70 passing between spools 71 and 72. First gate 66 is closed or opened to pass square waves representing "yes" by means of control unit 85 connected by leads 83—84 and receiving signals indicating the information to be recorded from the source of information to be recorded 86 connected to control unit 85 by leads 87—88. The second gate 80 which stops or passes phase inverted square wave signals representing "no" is also controlled by control unit 85 over leads 89—90. The phase inverted square signals are represented at J. Typical first gate "yes" signals are shown at K, second gate output "no" signals at L and the resultant of the two are recorded at M. The source of information to be recorded 86 may be any suitable device which provides a characteristic signal or output voltage condition distinctive for "yes" and "no" information. The control unit 85 may be any suitable device which accepts the "yes" and "no" distinctive signals or voltage conditions from source 86 and provides a gate opening control signal to gate 66 in response to the "yes" signal or condition and a gate opening control signal to gate 80 in response to the "no" signal or condition. Square wave signals are applied to source 86 over leads 76—77 in order to "clock" or synchronize the rate at which "yes" and "no" information is fed out. One mode of operation of the source is to feed out one "bit" of information i. e. a "yes" or "no" signal or voltage condition, for each cycle of the square wave. While not shown it will be understood that the rate of travel of the magnetic recording medium 70 may be synchronized by means of the square wave from source 63 as by using a step drive such as shown in Fig. 2 or by other well known synchronizing means.

Figure 5:
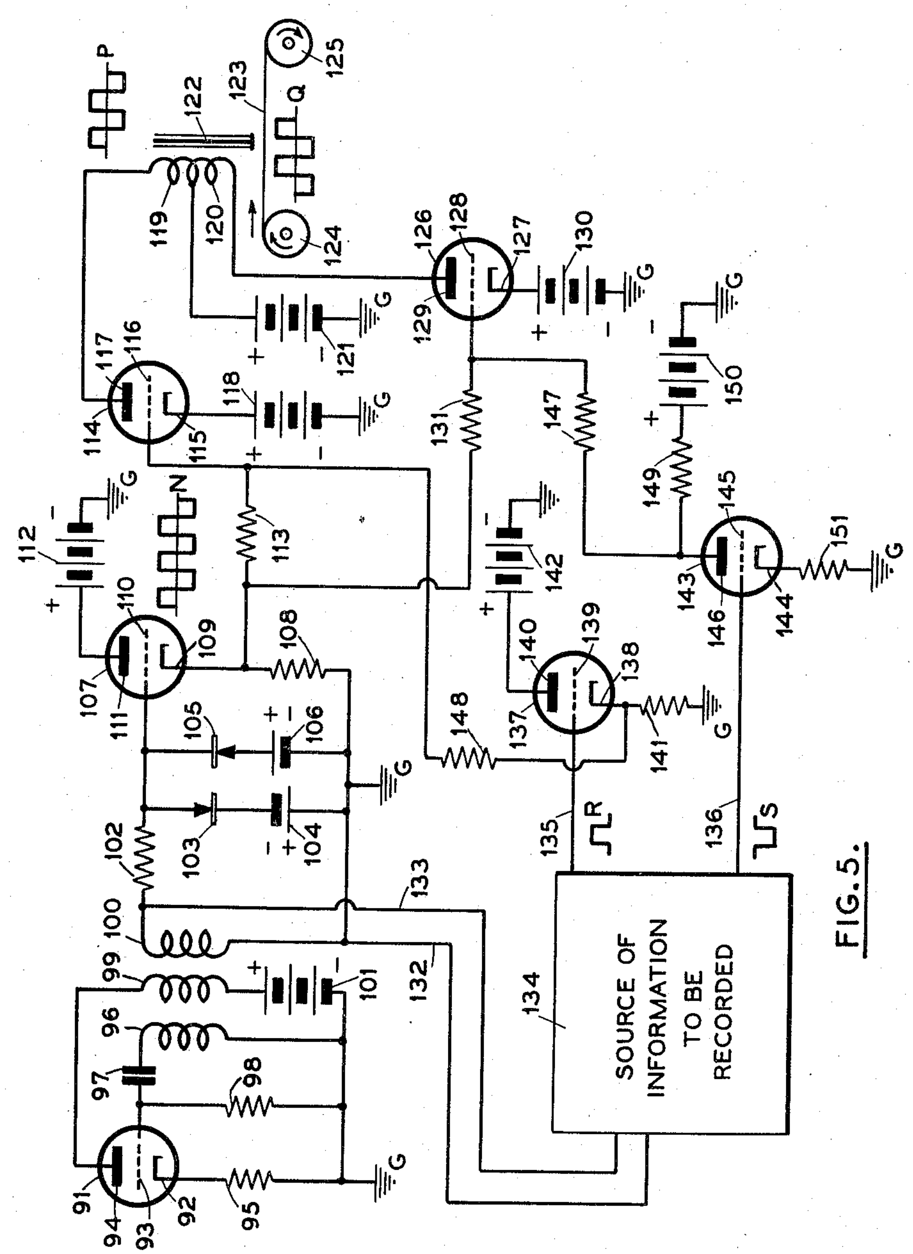
Fig. 5 shows circuit details of a further modified form of the invention.

Fig. 5 shows circuit details of a system according to the present invention similar to the one shown in Fig. 4. The square wave generator consists in a thermionic vacuum tube oscillator, rectifier clippers and an output coupling tube. The oscillator circuit includes tube 91 having a cathode 92 heated by conventional means not shown, control grid 93 and plate 94, connected to a tank coil 99 tuned to a suitable frequency by capacitor 152, a feedback coil 96, grid capacitor 97, grid leak 98 and cathode resistor 95. Plate voltage is supplied by a convenient source such as battery 101. The constants of the circuit are chosen in a manner well-known in the art to provide stable and essentially sine-wave oscillations. An output voltage is taken from the circuit by means of coil 100 coupled to the tank coil 99 fed through a current limiting resistor 102 and across oppositely connected rectifier clippers 103 and 105 which produces a square-wave from the sine-wave input. Batteries 104 and 106 may be used to provide initial bias on rectifiers 103 and 105 respectively determining the point at which they start to clip and hence the amplitude of the resulting square wave. The output coupling tube 107 having a cathode 109 heated by conventional means, not shown, a control grid 110 and plate 111 receives the square waves between grid 110 and cathode 109 through cathode resistor 108. Plate voltage is supplied from a suitable source such as battery 112. The amplified square waves are fed out by taking the voltage off across cathode resistor 108. Tubes 114 and 126 are the gates which also supply magnetizing currents to the recorder head 119—120—122 for recording on the magnetic medium 123 passed between spools 124 and 125. Tube 114 includes cathode 115 heated by conventional means, not shown, and connected to a source of bias 118 sufficient to maintain it normally at cut-off, a control grid 116 connected to the source of square waves 108 through resistor 113, and plate 117 connected to coil 119 of the recording head and to a source of plate voltage 121. Tube 126 similarly includes cathode 127 heated by conventional means, not shown, control grid 128, and plate 129. Cathode 127 is connected to bias battery 130 and plate 126 is connected through recording head coil 120 to plate voltage battery 121. It will be seen that tubes 114 and 126 are connected to magnetize recording head core 122 in opposite directions so that the tubes themselves may be considered as gates and the connections to the recording coils and the input source of square waves function to provide phase inversion. Control of tubes 114 and 126 is provided by tubes 137 and 143. Tube 137 includes cathode 138 heated by conventional means, not shown, control grid 138 and plate 140. Grid 139 is connected to the source of information to be recorded 134 by lead 135. Cathode 138 is connected to a cathode load resistor 141. Plate 140 is connected to a source of plate voltage 142. The cathode end of load resistor 141 is connected through decoupling resistor 148 to grid 116 of tube 114. With bias 118, less the "no" signal drop across resistor 141, sufficient to cut-off tube 114 plate current, a positive pulse, as shown at R, applied to grid 139 from source 134 will produce a positive pulse across resistor 141 and at grid 116 causing tube 114 to become active. When tube 114 is thus activated, the square wave signals as shown at N applied to its grid will be amplified and will energize coil 119 recording signals such as shown at P on magnetic medium 123. In a similar manner tube 145 having cathode 144 heated by conventional means, not shown, control grid 145 and plate 146 receives control signals on its grid over lead 136 from source 134 and controls tube 128 over through decoupling resistor 147. Cathode 144 is connected to ground G through self-bias resistor 151 and plate 146 is connected through load resistor 149 to a source of plate voltage 150. It will be seen that if bias 130 less the difference between the voltage of battery 150 and the "no" signal drop in resistor 149 is sufficient to cut off tube 126, that when a negative pulse is placed on grid 145 from source 134 as shown at S, the voltage on plate 146 will rise and so will the voltage of grid 128 and tube 126 will become activated. When tube 126 is activated, square wave signal N on its grid will be amplified and plate current will flow in recording head coil 120 to record a reversed square wave on magnetic medium 123 as shown at Q. Thus tubes 137 and 143 may be considered control tubes and they will activate the gate tubes providing either direct or reversed polarity square wave recordings depending on whether a positive or negative control pulse is received from the source of information to be recorded. In the case shown the positive pulse R may be regarded as representing "yes" and will provide in-phase square waves to be recorded while the negative pulse S may be regarded as representing "no" and will provide out-of-phase square waves to be recorded on the magnetic medium.

Figure 6:
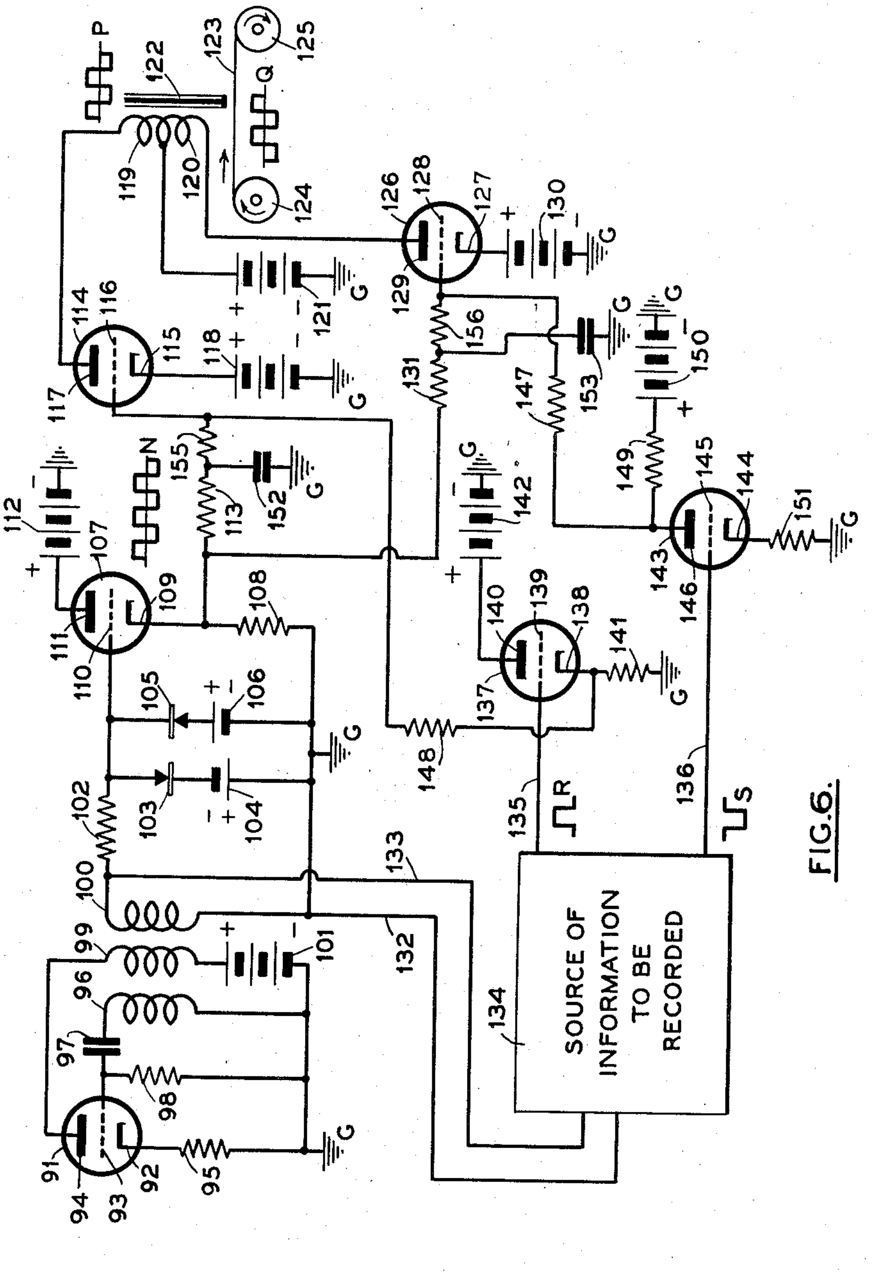
Fig. 6 shows circuit details of still another form of the invention.

It is common practice to utilize recording heads having self-inductance which is too low to maintain current proportional to the time integral of the recording voltage in the range of frequencies with which this invention is concerned. When such a recording head is used, the play-back will produce a sharp pip at the start of the square wave and at each transition from one polarity to the other. In order to provide a square wave in the play-back the recording voltage may be integrated as, for instance, by the integrating circuits as shown in Fig. 6 where numerals similar to those of Fig. 5 designate similar parts consisting of resistor 113 and capacitor 152 connected at grid 116 and resistor 131 and capacitor 153 connected at grid 128 in the path of the square wave voltage in Fig. 5. Resistors 155 and 156 prevent integration of the gating pulses. The effect of the integration on the recording current is shown in Fig. 6 where at X is shown the integration of the voltage shown at V. With this integrated recording voltage or current having two values of $d\phi/dt$ the play-back voltage will consist of two potentials in sequence determined by the order in which the changes in sign of the slope of the recording voltage occur and the changes in potential will be predetermined in time and will take place at the points at which the slope of the recording voltage or current changes sign. According to the present invention, the square recording voltage waves are contiguous, the slopes resulting from the integration and the potential reversing play-back waves are also contiguous. That is, the "bits" or individual wave cycles each representing a "yes" or a "no" are contiguous in order to provide the maximum lineal wave density characteristic of the present invention. The term contiguous is used in the sense of in contact i. e. there is no separation between adjacent waves.

Fig. 6 shows various wave forms useful in explaining the invention. At T are shown two rectangular pulses, the first positive and the second negative. If these two pulses are recorded on a magnetic medium and then reproduced from the record, the reproduced signal will be of the form shown at U which shows the spreading effect encountered in this type of recording and explains why only a limited number of pulses may be recorded per unit length of the recording medium. If, on the other hand, square waves of the form shown at V are continuously and contiguously recorded, the reproduced wave form will be as shown at W. This will make clear how a great deal more information may be recorded per unit length of the recording medium using the method and means of the present invention. In practice an increase in information per unit length of the order of four times has been realized. Using the method and means of the present invention it has been found possible to record 300–400 bits of information per inch on standard commercial magnetic wires and tapes.

At Y is shown a typical series of bits of information after integration. Directly below Z is shown the composite square waves before integration which is also the play-back voltage from the recordings. It will be seen that the bits of information in integrated form are represented by a symmetrical signal having two opposite slope components in predetermined sequence and with a reversal in slope at the center of the bit. Also it will be seen that the composite square-wave representing the voltage to be recorded or the play-back voltage has a zero cross-over at the center of each bit as indicated by the small arrows. These cross-overs may be used to provide "clock" pulses so that the wave may be termed "self-clocking." Since these clock points are equally spaced regardless of the combination of "yes" and "no" bits of information it will be apparent that they may be utilized to clock the recording in ways which will be evident to those skilled in the art.

Some of the terms used in the specification and claim will now be defined. The term "complex wave" is used to denote a transient or not regularly repeated wave shape or a steady state wave containing more than one frequency component. The term "linear network" is used to denote one containing only amplitude-linear devices such as amplifiers of this character and substantially pure R, L and C elements. The term "amplitude distortion" is used to indicate such distortion of a complex wave as is produced by the non-uniform frequency response of a linear network. The term "lineal wave density" is used in connection with magnetic recording to indicate the number of waves, or sensibly separable magnets induced in the medium, per unit length along the recording track, without regard to wave amplitude or flux density at any point on these magnets.

While only a few forms of the present invention have been shown and described, many modifications will be apparent to those skilled in the art within the spirit and scope of the invention as set forth in the appended claim.

What is claimed is:

An information recording device including in combination, a magnetic recording medium, a source of yes and no information to be recorded, wherein said information occurs in continuously periodic form, means for providing a square wave of one phase in accordance with the occurrence of said yes information and having the same period as said information, means for providing a square wave of a second phase in accordance with the occurrence of said no information contiguously related to said square wave of said first phase, means for combining said two square waves to form a continuously periodic wave composed of segments having periods equal to the period of said square waves and segments having periods equals to twice the period of said square waves; and means for recording said periodic waves upon said recording medium.

References Cited in the file of this patent

UNITED STATES PATENTS

| | | |
|---|---|---|
| 2,397,604 | Hartley et al. | Apr. 2, 1946 |
| 2,436,512 | Hollywood | Feb. 24, 1948 |
| 2,452,547 | Chatterjea et al. | Nov. 2, 1948 |
| 2,536,816 | Krumhansl et al. | Jan. 2, 1951 |
| 2,540,654 | Cohen et al. | Feb. 6, 1951 |
| 2,575,342 | Gridley | Nov. 20, 1951 |
| 2,607,035 | Lavine | Aug. 12, 1952 |
| 2,633,564 | Fleming | Mar. 31, 1953 |

OTHER REFERENCES

Publication: High Speed Computing Devices, p. 330, McGraw-Hill Book Co. Inc., publisher.